United States Patent
Engle et al.

(10) Patent No.: US 10,885,599 B2
(45) Date of Patent: *Jan. 5, 2021

(54) EFFICIENT RIDE REQUEST

(71) Applicant: GM GLOBAL TECHNOLOGY OPERATIONS LLC, Detroit, MI (US)

(72) Inventors: Stephanie Olivia Engle, San Francisco, CA (US); Mariya Jacobo, San Francisco, CA (US); Divya Thakur, San Francisco, CA (US); Bradley David Ryan, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/371,053

(22) Filed: Mar. 31, 2019

(65) Prior Publication Data

US 2020/0065931 A1 Feb. 27, 2020

Related U.S. Application Data

(62) Division of application No. 16/106,824, filed on Aug. 21, 2018.

(51) Int. Cl.
*G06Q 50/30* (2012.01)
*H04W 4/029* (2018.01)

(52) U.S. Cl.
CPC ............ *G06Q 50/30* (2013.01); *H04W 4/029* (2018.02)

(58) Field of Classification Search
CPC ........ G06Q 50/30; H04W 4/029; H04W 4/02; H04W 4/04; H04W 4/043; H04W 4/046; H04W 4/38; H04W 4/40; H04W 4/44
See application file for complete search history.

(56) References Cited

U.S. PATENT DOCUMENTS 8,086,283 B2 12/2011 Parker et al.
8,554,608 B1 10/2013 O'Connor
(Continued)

OTHER PUBLICATIONS

"Non-Final Office Action for U.S. Appl. No. 16/106,824", dated Jan. 25, 2019, 15 pages.
(Continued)

*Primary Examiner* — Dinh Nguyen
(74) *Attorney, Agent, or Firm* — Medley, Behrens & Lewis, LLC

(57) ABSTRACT

A device for hailing a vehicle includes a location sensor outputting location information indicative of a location of the device. The device further includes a device interface configured to receive an input from a user of the device. Responsive to the input, a transmitter of the device transmits the location information, input information, and identification information for the device to a dispatch server system. The transmitter is further configured to route the location information, the input information, and the identification information for the device to only the dispatch server system. The identification information is used by the dispatch server system to set a predefined location associated with the identification information as a destination for a trip for the user in the vehicle. The predefined location is defined in an account corresponding to the identification information of the device maintained by the dispatch server system prior to receipt of the input.

20 Claims, 10 Drawing Sheets

(56) References Cited

U.S. PATENT DOCUMENTS

| | | | |
|---|---|---|---|
| 9,494,938 B1* | 11/2016 | Kemler | G05D 1/0088 |
| 9,702,714 B2 | 6/2017 | Botea et al. | |
| 9,965,960 B1* | 5/2018 | McDavitt-Van Fleet | G06Q 10/00 |
| 10,325,103 B1 | 6/2019 | Austin et al. | |
| 2002/0095357 A1* | 7/2002 | Hunter | G06Q 10/0637 |
| | | | 705/7.36 |
| 2002/0193080 A1 | 12/2002 | Komsi et al. | |
| 2004/0049424 A1* | 3/2004 | Murray | G06Q 10/04 |
| | | | 705/14.14 |
| 2004/0180668 A1 | 9/2004 | Owens et al. | |
| 2005/0153707 A1* | 7/2005 | Ledyard | G01S 5/0018 |
| | | | 455/456.1 |
| 2005/0216412 A1 | 9/2005 | Kilinichenko et al. | |
| 2011/0022396 A1* | 1/2011 | Van De Sluis | H05B 47/12 |
| | | | 704/275 |
| 2011/0054956 A1 | 3/2011 | Meyer et al. | |
| 2011/0161001 A1 | 6/2011 | Fink | |
| 2012/0041675 A1 | 2/2012 | Juliver et al. | |
| 2012/0171983 A1 | 7/2012 | Eitel et al. | |
| 2013/0267204 A1 | 10/2013 | Schultz et al. | |
| 2014/0278044 A1 | 9/2014 | Jacobs et al. | |
| 2014/0354449 A1 | 12/2014 | Alam et al. | |
| 2016/0027306 A1 | 1/2016 | Lambert et al. | |
| 2016/0334797 A1* | 11/2016 | Ross | G08G 1/20 |
| 2017/0038948 A1 | 2/2017 | Cun et al. | |
| 2017/0132934 A1* | 5/2017 | Kentley | G08G 1/202 |
| 2017/0220876 A1 | 8/2017 | Gao et al. | |
| 2018/0053412 A1 | 2/2018 | Iagnemma et al. | |
| 2018/0091724 A1 | 3/2018 | Zewail et al. | |
| 2018/0143027 A1* | 5/2018 | Schlesinger | G06Q 50/30 |
| 2018/0253225 A1 | 9/2018 | Zhang et al. | |
| 2018/0357907 A1* | 12/2018 | Reiley | H04W 4/023 |
| 2019/0122531 A1 | 4/2019 | Harris | |
| 2019/0236852 A1 | 8/2019 | Ito et al. | |
| 2020/0065928 A1 | 2/2020 | Engle et al. | |
| 2020/0065930 A1 | 2/2020 | Engle et al. | |

OTHER PUBLICATIONS

"Reply to Non-Final Office Action for U.S. Appl. No. 16/106,824", filed Apr. 25, 2019, 15 Pages.

"Final Office Action for U.S. Appl. No. 16/106,824", dated May 30, 2019, 20 Pages.

"Reply to Final Office Action for U.S. Appl. No. 16/106,824", filed Aug. 30, 2019, 17 Pages.

"Non-Final Office Action for U.S. Appl. No. 16/106,824", dated Nov. 29, 2019, 30 Pages.

"Reply to Non-Final Office Action for U.S. Appl. No. 16/106,824", filed Mar. 30, 2020, 23 Pages.

"Final Office Action for U.S. Appl. No. 16/106,824", dated Jun. 11, 2020, 29 Pages.

"Reply to Final Office Action for U.S. Appl. No. 16/106,824", filed Sep. 11, 2020, 14 Pages.

"Notice of Allowance and Fees Due for U.S. Appl. No. 16/106,824", dated Sep. 23, 2020, 9 Pages.

"Non-Final Office Action for U.S. Appl. No. 16/371,022", dated May 2, 2019, 23 Pages.

"Reply to Non-Final Office Action for U.S. Appl. No. 16/371,022", filed Aug. 2, 2019, 16 Pages.

"Final Office Action for U.S. Appl. No. 16/371,022", dated Sep. 4, 2019, 27 Pages.

"Reply to Final Office Action for U.S. Appl. No. 16/371,022", filed Dec. 4, 2019, 20 Pages.

"Non-Final Office Action for U.S. Appl. No. 16/371,022", dated Feb. 6, 2020, 34 Pages.

"Reply to Non-Final Office Action for U.S. Appl. No. 16/371,022", filed May 6, 2020, 23 Pages.

"Final Office Action for U.S. Appl. No. 16/371,022" dated Jul. 14, 2020, 35 Pages.

"Reply to Final Office Action for U.S. Appl. No. 16/371,022", filed Oct. 14, 2020, 14 Pages.

* cited by examiner

EFFICIENT RIDE REQUEST

RELATED APPLICATION

This application is a divisional of U.S. patent application Ser. No. 16/106,824, filed on Aug. 21, 2018, and entitled "EFFICIENT RIDE REQUEST", the entirety of which is incorporated herein by reference.

BACKGROUND

An autonomous vehicle is a motorized vehicle that can operate without human conduction. The autonomous vehicle can be controlled to travel from an initial location (e.g., a pick-up location, a current geographic location) to a destination. The autonomous vehicle can access roadway information to determine a travel route from the initial location to the destination.

Requesting a ride in an autonomous vehicle commonly requires a user to download an autonomous vehicle application on their mobile computing device (e.g., cellphone) to access a network of autonomous vehicles. The user typically provides an explicit input in the autonomous vehicle application specifying an address of a destination for the ride in the autonomous vehicle. The user further oftentimes provides an address of a pick-up location for the ride (e.g., via explicit input in the autonomous vehicle application, utilizing location tracking of the mobile computing device).

In some situations, however, conventional approaches for requesting a ride in a vehicle may be time consuming. Moreover, the traditional techniques for requesting a ride may provide few, if any, options for administering restrictions regarding the trips being requested.

SUMMARY

The following is a brief summary of subject matter that is described in greater detail herein. This summary is not intended to be limiting as to scope of the claims.

In accordance with various aspects, provided herein is a device for hailing a vehicle. The device includes a location sensor configured to output location information indicative of a location of the device. The device further includes a device interface configured to receive an input from a user of the device. The device yet further includes a transmitter. Responsive to the input, the transmitter is configured to transmit the location information of the device, input information, and identification information for the device to a dispatch server system. The input information corresponds to the input from the user received by the device interface. The transmitter is further configured to route the location information of the device, the input information, and the identification information for the device to only the dispatch server system. The identification information is configured for use by the dispatch server system to set a predefined location associated with the identification information of the device as a destination for a trip for the user in the vehicle. The predefined location is defined in an account corresponding to the identification information of the device maintained by the dispatch server system prior to receipt of the input. Further, the location information can be used by the dispatch server system to set a pick-up location for the trip for the user in the vehicle.

Moreover, in accordance with various aspects, a dynamic pick-up location for a trip of a user in a vehicle can be controlled by a dispatch server system. A request for the trip in the vehicle can be received at the dispatch server system. The request includes identification information specifying an identity of a device associated with the user. The request further includes location information specifying a location of the device associated with the user. The dispatch server system may be configured to be a dedicated endpoint of information routed from the device. Moreover, based on the request, a predefined location associated with the identification information of the device can be set as a destination for the trip of the user in the vehicle. The predefined location is defined in an account corresponding to the identification information of the device maintained by the dispatch server system. Further, based on the request, the dynamic pick-up location for the trip of the vehicle can be set as the location of the device as specified by the location information. The vehicle can also be caused to move to the dynamic pick-up location for the trip of the user in the vehicle to the destination as set to the predefined location (e.g., by the dispatch server system).

Further, in accordance with various aspects, provided is an autonomous vehicle. The autonomous vehicle includes a vehicle propulsion system, a braking system, a steering system, and a computing system that is in communication with the vehicle propulsion system, the braking system, and the steering system. The computing system of the autonomous vehicle receives a request for a trip of a passenger in the autonomous vehicle from a dispatch server system. The request includes a predefined location associated with a device of the passenger. The request is received from the dispatch server system, which is configured to be a dedicated endpoint of information routed from the device. The dispatch server system receives identification information specifying an identity of the device and the predefined location is defined in an account corresponding to the identification information of the device maintained by the dispatch server system prior to receipt of the identification information. The computing system of the autonomous vehicle is further configured to set a destination for the trip in the autonomous vehicle. The destination for the trip in the autonomous vehicle is set as the predefined location. Moreover, the computing system of the autonomous vehicle is configured to control at least one of the vehicle propulsion system, the braking system, or the steering system to move the autonomous vehicle along the trip of the autonomous vehicle to the destination as set to the predefined location.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
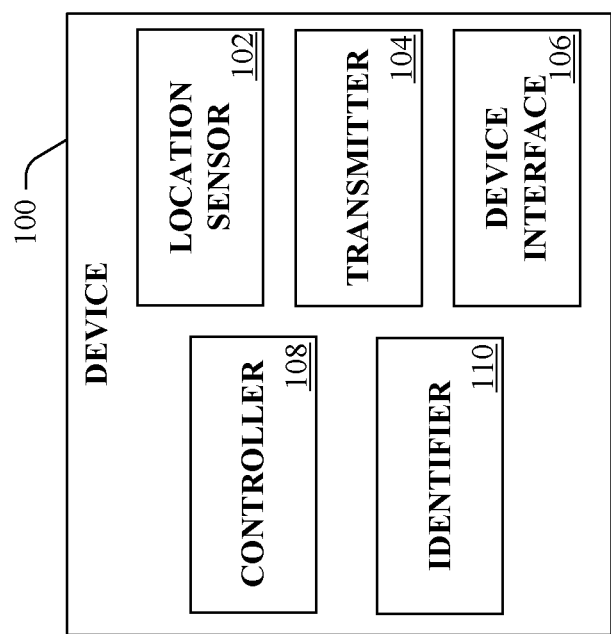
FIG. 1 illustrates an exemplary device for hailing a vehicle.

Various technologies pertaining to hailing vehicles for a trip in the vehicle to a destination are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Requesting a ride in a vehicle for a user may be a time-consuming process because the user may be required to download an application on their mobile computing device in order to access a network of vehicles to request the ride. The user may then input a destination for the trip into the application and turn on the mobile computing device's location tracking to establish a pick-up location for the user. In contrast, the disclosed device is a dedicated device for summoning a vehicle to a current location of the device (e.g., a pick-up location for a trip), where a destination for the trip in the vehicle is a predefined location set for the device (e.g., a home of the user of the device). Accordingly, a simplified input can be received via the device (e.g., a single press of a button of the device) to cause the vehicle to be hailed for the trip to the predefined location.

With reference now to FIG. 1, an exemplary device 100 is illustrated. The device 100 can be operated by a user to request a vehicle for a trip to a destination. The user hails the vehicle for the trip by providing an input activating the device 100. The device 100 can include a location sensor 102, a transmitter 104, a device interface 106, and a controller 108.

According to an example, the device 100 can be a hardware fob that allows a user to summon a vehicle to a current location and causes the vehicle to provide a trip to a preset destination (e.g., home).

The controller 108 can execute a limited set of computer-executable instructions. For example, the controller 108 can be an application-specific integrated circuit (ASIC) customized for executing instructions to be performed by the device 100; however, other types of controllers other than ASICs are intended to fall within the scope of the hereto appended claims. The controller 108 can control operation of the location sensor 102, the transmitter 104, and the device interface 106 of the device 100.

Moreover, the device 100 is configured to operate with a dispatch server system (as described in greater detail below). Accordingly, the transmitter 104 is configured to route information sent from the device 100 to only the dispatch server system. For instance, location information of the device 100, input information, and identification information for the device 100 can be routed by the transmitter 104 to only the dispatch server system.

The device interface 106 can receive the input from the user of the device 100. According to various examples, the device interface 106 can be a switch, a voice recognition module, a gesture recognition module, or the like. For instance, a switch (e.g., the device interface 106) of the device 100 can be a pushbutton that can be depressible to receive input from the user. It is contemplated that a switch (e.g., the device interface 106) of the device 100 can be a mechanical switch, a switch that is part of a touchscreen, and so forth. Responsive to the input being received via the device interface 106, input information that corresponds to the input from the user received by the device interface 106 can be generated (e.g., by the controller 108, for transmission via the transmitter 104). Pursuant to an illustration, the input information can indicate the occurrence of the input being received by the device interface 106. By way of another illustration, if the device 100 includes more than one device interface, then the input information generated responsive to receipt of the input can indicate an identity of the device interface that received the input (e.g., an identity of a switch from a plurality of switches selected by the user).

By way of example, where the device interface 106 is a switch, the input received via the switch can be a press, touch, manipulation, or other user interaction with the switch. By way of another example, where the device interface 106 is a voice recognition module, the input received via the voice recognition module may be a command vocalized by the user of the device 100 (e.g., "take me home"). The voice recognition module may utilize a specific activation phrase (e.g., "Hi Device") before the user vocally states the command and/or may require the user to employ specific phrasing when providing the vocal command. By way of a further example, where the device interface 106 is a gesture recognition module, the input received via the gesture recognition module can be a gesture performed by the user of the device 100. Following this example, according to an illustration, the user may extend an arm outward mimicking hailing a taxi while holding the device 100; thus, movement of the device 100 can be detected by the device 100 and the gesture recognition module can determine that the movement corresponds to a predefined gesture for the device 100 (e.g., the predefined gesture of extending an arm outward while holding the device 100 can cause a vehicle to be hailed).

The location sensor 102 can output location information indicative of a location of the device 100. Substantially any type of location sensor 102 is intended to fall within the scope of the hereto appended claims. According to an example, the location sensor 102 can be a global positioning system (GPS) sensor that can output location information indicative of a geographic location of the device 100. However, other techniques for detecting the location of the device 100 are contemplated. For instance, the location sensor 102 can determine the location of the device 100 based on known location(s) of available Wi-Fi networks(s) (e.g., available at a geographic position of the device 100), signals received from nodes in a wireless network (e.g., triangulation in a cellular network), or the like.

The location information outputted by the location sensor 102 can be utilized to establish a pick-up location (e.g., a geographic location at which a user is picked up or to be picked up by the vehicle) for the trip. It is contemplated that the location sensor 102 may output the location information continuously, periodically, upon receipt of the input, or any other preferred configuration. Moreover, the transmitter 104 can transmit the location information, as described in greater detail below.

In one embodiment, the device 100 may further include an accelerometer. The location sensor 102 may be further configured, responsive to movement detected by the accelerometer, to output updated location information indicative of a current location of the device 100 after receipt of the input.

In another embodiment, the location sensor 102 may be further configured to output updated location information indicative of a current location of the device 100 at periodic intervals after receipt of the input.

The device 100 further has an identifier 110 that signifies an identity of the device 100. The identifier 110 may uniquely identify the device 100. It is contemplated that any type of identifier is intended to fall within the scope of the hereto appended claims. Identification information that includes at least the identifier 110 can be sent via the transmitter 104 to the dispatch server system (as part of a request) to enable the device 100 to be identified.

According to an example, in an effort to prevent accidental vehicle hails, the device 100 can output user intention data. The user intention data signifies whether the input received by the device interface 106 was intentionally provided to hail the vehicle. In one embodiment, the user intention data can be generated by a camera configured to determine an environment in a vicinity of the device 100; for example, the camera can detect the amount of light present around the device 100. By way of illustration, when the device 100 is in a bag or a pocket of a user the light around the device 100 may be minimal and input received at that time may be provided accidentally; thus, the user intention data can signify the unintentional nature of the input received by the device 100.

In another embodiment, the user intention data can be generated by a gyroscope configured to determine an orientation of the device interface 106 at the time of receipt of the input. For example, where the device interface 106 comprises a push button and the device interface 106 is facing downward when the input is received, the input may have been provided accidentally; again, the user intention data can indicate the unintentional nature of the input received by the device 100.

The device 100 is configured, via the transmitter 104, to transmit a request for the trip in the vehicle to a dispatch server system. The request can include the identification information, the input information, the location information, or the user intention data. The transmitter 104 may be further configured to transmit the updated location information of the device 100 discussed above to the dispatch server system as well. In order to simplify requesting the trip in the vehicle, the transmitter 104 is further configured to route the identification for the device 100, the location information of the device 100, and the input identification to only the dispatch server system.

Figure 2:
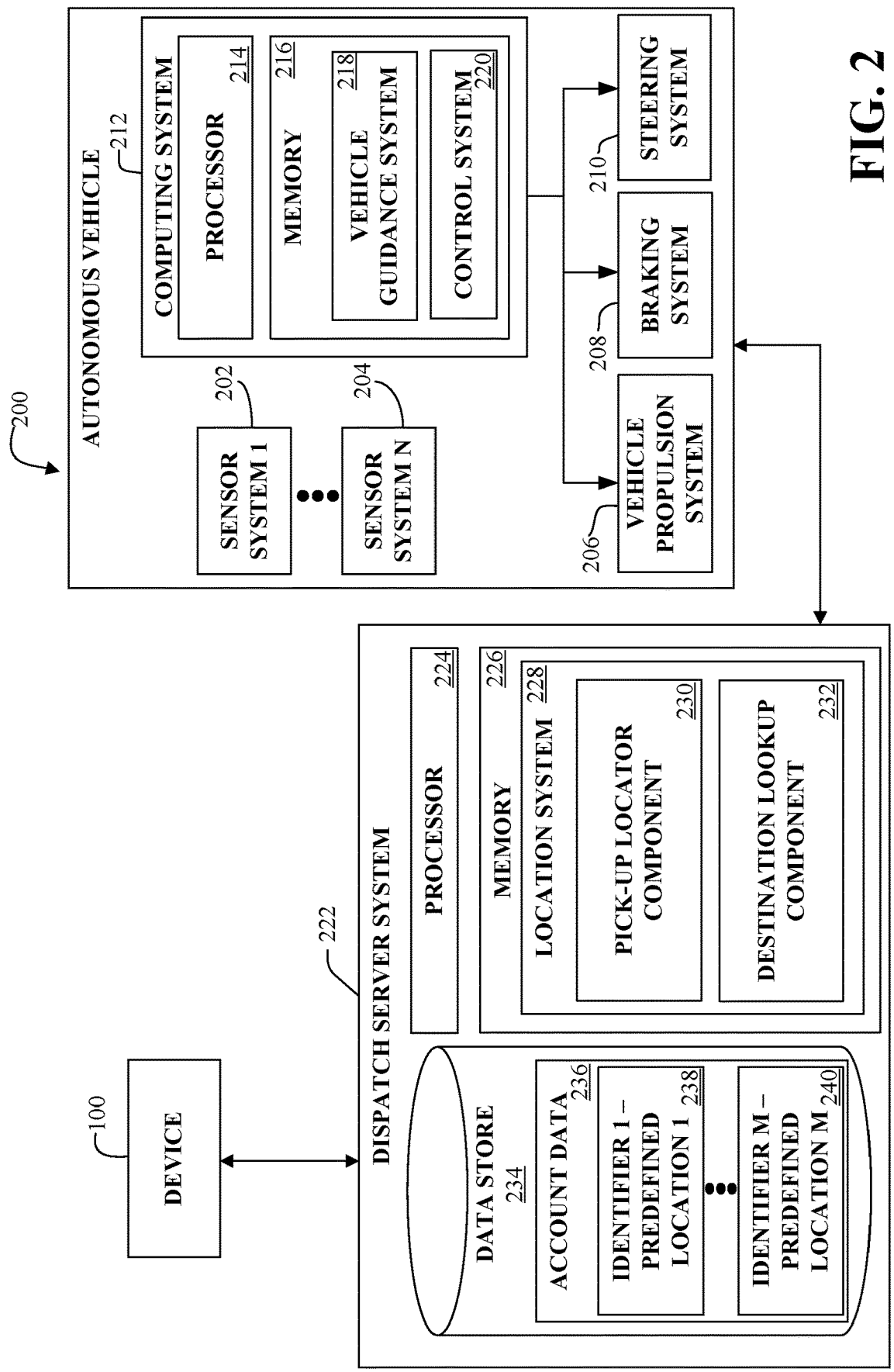
FIG. 2 illustrates an exemplary dispatch server system and an exemplary autonomous vehicle.

Turning now to FIG. 2, an exemplary dispatch server system 222 is illustrated. The dispatch server system 222 is configured to be a dedicated endpoint of information routed from the device 100. In an embodiment, the dispatch server system 222 may be configured to be a dedicated endpoint of all information routed from device 100. The dispatch server system 222 includes at least one processor 224 and memory 226 that includes computer-executable instructions that are executed by the at least one processor 224. The dispatch server system 222 further includes a data store 234 which may include account data 236. The account data 236 may include predefined locations assigned to identification information of devices. For instance, the identification information of the device 100 may be assigned a predefined location (or more than one predefined location) in the account data 236. A predefined location included in the account data 236 can be an address, a name of a place, geographic coordinates, or the like.

The memory 226 includes a location system 228 that can set geographic locations for a trip of a vehicle. More particularly, the location system 228 can dynamically control setting a pick-up location for a passenger for a trip in the vehicle. The location system 228 can further set a destination for the trip of the vehicle based on the information transmitted from the device 100.

The location system 228 may include a pick-up locator component 230. The pick-up locator component 230 can, responsive to receipt of the request for the trip in the vehicle from the device 100, set a pick-up location for the trip as the location of the device 100. The location of the device 100 may be specified by the location information provided in the request. The pick-up locator component 230 can evaluate the location information to determine a geolocation of the device 100 to set as the pick-up location. For example, where the location information comprises Wi-Fi networks in a vicinity of the device 100, the pick-up locator component 230 can triangulate a geolocation of the device 100 based on the Wi-Fi networks in the vicinity of the device 100. According to another example, the location information received as part of the request can include geographic coordinates or an address specifying the geographic location of the device 100, which can be utilized by the pick-up locator component 230 to set as the pick-up location for the trip.

Because the device 100 can be moveable, the pick-up location for the trip in the vehicle can be a dynamic location (e.g., the geographic location of the device 100 can change between a time when the trip in the vehicle is requested via the device 100 and a time when the vehicle arrives to pick-up a user). According to an example, a request for a trip of a user in a vehicle transmitted from a device 100 can be received by the dispatch server system 222. The request can include location information specifying a location of the device 100 associated with the user. The pick-up locator component 230 can then establish a pick-up location for the trip in the vehicle based on the location information provided by the device 100. Data indicating modification to the location of the device (if any) after receipt of the request can further be communicated from the device 100 to the dispatch server system 222; accordingly, the pick-up locator component 230 can dynamically adjust the pick-up location for the trip in the vehicle based on the modification to the location of the device 100.

The location system 228 may further include a destination lookup component 232. The destination lookup component 232 can, responsive to receipt of the request for the trip in the vehicle from the device 100, access the account data 236 to obtain a predefined location associated with the device 100. The predefined location is defined in the account data 236 prior to receipt of the request. For example, a user of the device 100 or a third party may set the predefined location prior to requesting the trip via the device 100. According to an illustration, the predefined location can be defined for the device 100 in the corresponding account during setup of the device 100. Following this illustration, the predefined location can be assigned as a home address of a user of the device 100, a work address of a user of the device 100, or the like. It is also contemplated that the predefined location can be updated (e.g., the account of the device 100 can be updated to modify or add a predefined location).

The predefined location is stored in the account data 236 in an account corresponding to the identification information. The account data 236 may comprise a plurality of accounts, each corresponding to identification information of a different device. Each of the plurality of accounts includes at least one predefined location. For example, as shown in FIG. 2, the account data 236 includes an account 1 238 including predefined location 1 associated with identifier 1, . . . , and an account M 240 including predefined location M associated with identifier M, where M can be substantially any integer greater than one. The destination lookup component 232 can use the identification information of the device 100 provided in the request to determine an identity of the device 100 to locate the corresponding account and to determine the predefined location associated with that account.

After a predefined location is defined in an account corresponding to specific identification information, requests for a trip in a vehicle from a device corresponding to that identification information can automatically have the predefined location set as a destination for the trip. This allows a user to request a trip in a vehicle using the device 100 without having input an address as a destination for the trip.

The dispatch server system 222 can further determine, based on the user intention data received from the device 100, whether the request was intentionally provided by the user. Where the request was not intentionally provided by the user, the dispatch server system 222 can prevent transmission of information from the dispatch server system 222 to a vehicle. Thus, the dispatch server system 222 can prevent unintentional hails of the vehicle.

As briefly mentioned above, the dispatch server system 222 can further transmit information to a vehicle designated for the requested trip in the vehicle. Transmitting the information to the vehicle may cause the vehicle to move to an endpoint. The information can include at least one of the pick-up location for the trip in the vehicle or the destination for the trip in the vehicle. For example, the pick-up locator component 230 can provide to the vehicle the dynamic pick-up location for the trip in the vehicle. The dynamic pick-up location can be dynamically adjusted based on a modification to the location of the device 100 after the pick-up locator component 230 receives the request. In another example, the destination lookup component 232 can provide to the vehicle the destination for the trip in the vehicle. As discussed above, the destination comprises a predefined location associated with the device 100 operated by a user requesting the trip in the vehicle.

The vehicle used in the requested trip may be an autonomous vehicle 200 as shown in FIG. 2. However, it is contemplated that the vehicle can additionally or alternatively be human driven. For example, where the vehicle is human driven, the dispatch server system 222 may send the dynamic pick-up location and/or the location of the destination to a route planning system (e.g., GPS, internet-based mapping service, etc.). The route planning system then determines a route to the dynamic pick-up location and/or destination for the human driver to take. In another example, the autonomous vehicle 200 can be part of a fleet of autonomous vehicles that may be in communication with each other.

As shown in FIG. 2, an exemplary autonomous vehicle 200 is illustrated. The autonomous vehicle 200 can navigate about roadways without human conduction based upon sensor signals output by sensor systems of the autonomous vehicle 200. The autonomous vehicle 200 includes a plurality of sensor systems, namely, a sensor system 1 202, . . . , and a sensor system N 204, where N can be substantially any integer greater than one (collectively referred to herein as sensor systems). The sensor systems may be of different types and are be arranged about the autonomous vehicle 200. For example, the sensor system 1 202 may be a lidar sensor system and the sensor system N 204 may be a camera (image) system. Other exemplary sensor systems include radar sensor systems, GPS sensor systems, sonar sensor systems, infrared sensor systems, and the like.

The autonomous vehicle 200 includes several mechanical systems that are used to effectuate appropriate motion of the autonomous vehicle 200. For instance, the mechanical systems can include, but are not limited to, a vehicle propulsion system 206, a braking system 208, and a steering system 210. The vehicle propulsion system 206 may be an electric motor, an internal combustion engine, a combination thereof, or the like. The braking system 208 can include an engine brake, brake pads, actuators, and/or any other suitable componentry that is configured to assist in decelerating the autonomous vehicle 200. The steering system 210 includes suitable componentry that is configured to control the direction of the movement of the autonomous vehicle 200.

The autonomous vehicle 200 additionally includes a computing system 212 that is in communication with the sensor systems 202-204, the vehicle propulsion system 206, the braking system 208, and the steering system 210. The computing system 212 includes at least one processor 214 and memory 216 that includes computer-executable instructions that are executed by the processor 214. In an example, the processor 214 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FGPA), or the like.

The memory 216 includes a vehicle guidance system 218 that may be configured to dynamically control routing of the autonomous vehicle 200. More particularly, the vehicle guidance system 218 can control setting a dynamic pick-up location for the trip of the autonomous vehicle 200. The vehicle guidance system 218 can further control setting a destination for the trip of a passenger in the autonomous vehicle 200.

The memory 216 additionally includes a control system 220 that is configured to receive an output of the vehicle guidance system 218 and is further configured to control at least one of the mechanical systems (the vehicle propulsion system 206, the braking system 208, and/or the steering system 210) based upon the output of the vehicle guidance system 218. Thus, the control system 220 can control the mechanical system(s) of the autonomous vehicle 200 to move the autonomous vehicle 200 along the route as selected by the vehicle guidance system 218 for the trip to the pick-up location or the destination.

The autonomous vehicle 200 can also be in network communication with the dispatch server system 222. The autonomous vehicle 200 can wirelessly communicate with the dispatch server system 222. Data can be transmitted from the dispatch server system 222 to the autonomous vehicle 200. Further, data can be transmitted from the autonomous vehicle 200 to the dispatch server system 222.

Figure 3:
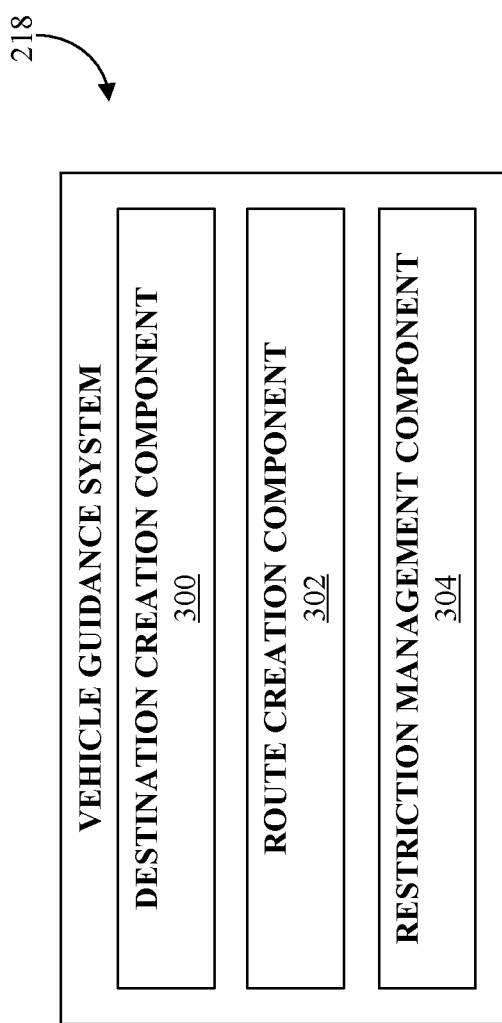
FIG. 3 is a functional block diagram of a vehicle guidance system.

Turning now to FIG. 3, the vehicle guidance system 218 of the autonomous vehicle 200 is described in greater detail. The vehicle guidance system 218 may include a destination creation component 300, a route creation component 302, and/or a restriction management component 304.

The destination creation component 300 is configured to receive data from the dispatch server system 222 specifying an endpoint for a route of the autonomous vehicle 200. The endpoint may comprise a pick-up location for a user of the device 100 requesting a trip in the autonomous vehicle 200 or a destination for the requested trip of the user in the autonomous vehicle 200.

The route creation component 302 is configured to interact with the destination creation component 300 and to determine at least one route from an initial location to the endpoint of the route. The computing system 212 may determine the at least one route by accessing roadway information to obtain roadways to plot at least one route from the initial location to the destination.

In an example, a user operates a device 100 to request a trip in the autonomous vehicle 200. The destination creation component 300 can set a pick-up location for the user as an endpoint for a route of the autonomous vehicle 200. As described above, the pick-up location may be established as a location of the device 100 at a time of receipt of the request by the dispatch server system 222. The route creation component 302 can determine a route to the pick-up location and the control system 220 can cause the autonomous vehicle 200 to move along the route to the pick-up location.

The destination creation component 300 can further dynamically adjust the pick-up location based on receipt of data signifying modification to the location of the device 100. Accordingly, the route creation component 302 can dynamically determine a route to the dynamically adjusted pick-up location and the control system 220 can cause the autonomous vehicle 200 to move along the dynamically determined route.

In another example, a user operates a device 100 to request a trip in the autonomous vehicle 200 to a destination. The destination creation component 300 can set a predefined location as the destination. As described above, the predefined location is defined in an account corresponding to the device 100 maintained by a dispatch server system 222 prior to receipt of the request. The route creation component 302 can determine a route to the destination and the control system 220 can cause the autonomous vehicle 200 to move along the route to the destination.

Moreover, the restriction management component 304 can receive a predefined restriction associated with a user of a device 100. Similar to the predefined location discussed above, the predefined restriction can be defined in the account data 236 in the dispatch server system 222 and can be associated with a corresponding identifier signifying an identity of a specific device 100 operated by the user. The predefined restriction may depend on a user's age, gender, accessibility concerns, preference, or the like.

The restriction management component 304 can control operation of the autonomous vehicle 200 based on the predefined restriction. For example, if the user is a child, a predefined restriction may include preventing ride-sharing or carpooling when the child is riding in the car (i.e., the autonomous vehicle 200 does not include any unauthorized passengers in addition to the child). By way of illustration, the predefined restriction can specify a whitelist of passengers permitted to ride in an autonomous vehicle with a child. A parent of the user may define this restriction in the account data 236 associated with the child's device as a safety precaution. In another example, if the user is in a wheelchair, a predefined restriction may include requiring the autonomous vehicle 200 used for a trip to a destination be wheelchair accessible.

Figure 4:
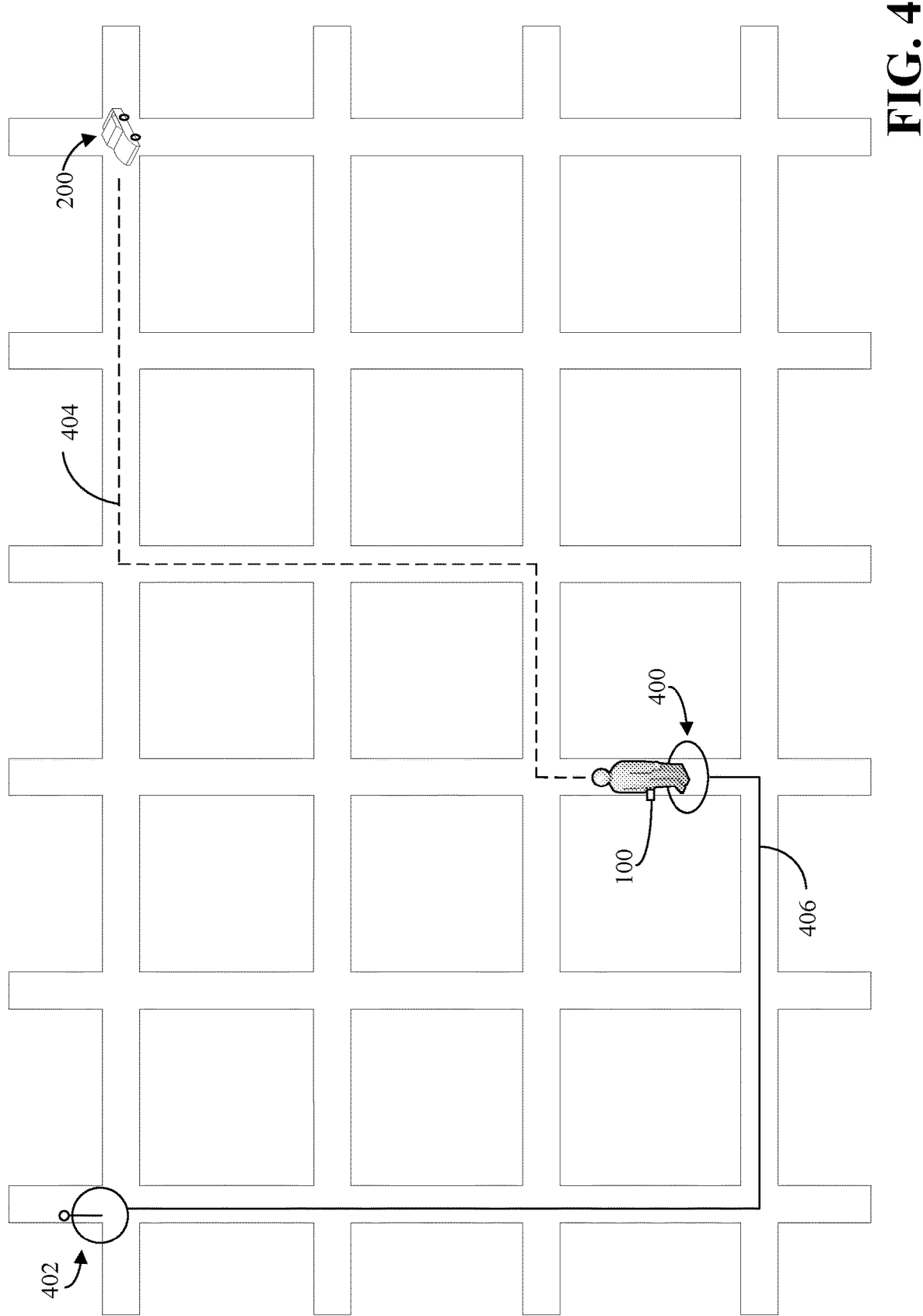
FIG. 4 is an overhead example of routing an autonomous vehicle.

Turning now to FIG. 4, illustrated is an exemplary embodiment of routing an autonomous vehicle 200 to a device 100 operated by a user and further routing the autonomous vehicle 200 to a destination 402. In the illustrated embodiment, the user enters an input into the device 100 to hail the autonomous vehicle 200 for a trip to the destination 402. The destination 402 can be set as a predefined location defined in an account corresponding to identification information of the device 100 maintained by the dispatch server system 222 prior to receipt of the input.

The autonomous vehicle 200 then travels along a first route 404 from an initial location to a pick-up location 400 for the user. The pick-up location 400 can be defined by a dynamic location of the device 100. The first route 404 adjusts based on modifications to the location of the device 100 after receipt of the input.

After reaching the pick-up location 404, the autonomous vehicle 200 then travels along a second route 406 from the pick-up location 400 to the destination 402.

Figure 5:
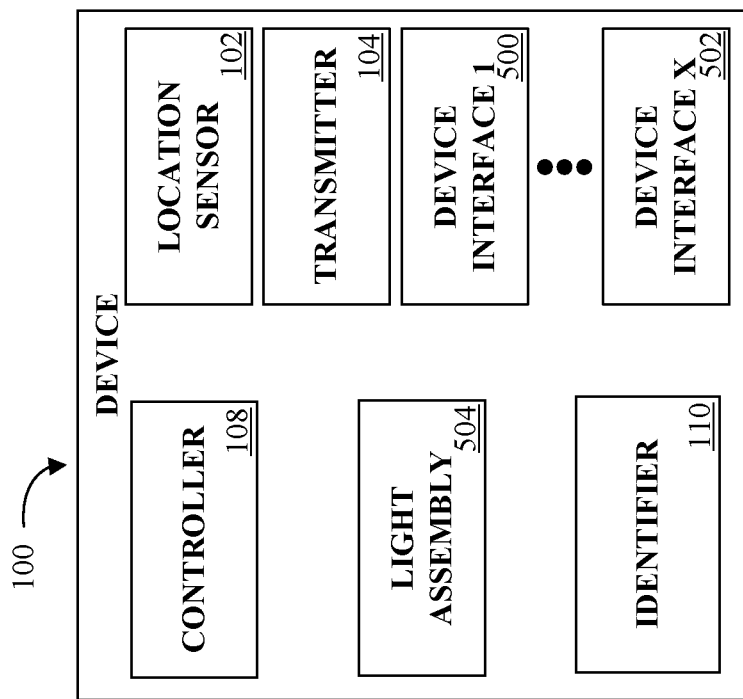
FIG. 5 illustrates another exemplary device for hailing a vehicle.

Turning to FIG. 5, illustrated is the device 100 according to various embodiments. As shown in FIG. 5, the device 100 can include a plurality of device interfaces; more particularly, the device 100 can include a device interface 1 500, . . . , and a device interface X 502, where X can be substantially any integer greater than one (collectively referred to as device interfaces 500-502). The device interfaces 500-502 can include the device interface 106 of FIG. 1. In the embodiment shown in FIG. 5, the input information corresponds to the input from the user received by a particular device interface (e.g., the device interface 1 500) from the device interfaces 500-502 (e.g., the input information identifies the particular device interface via which the input is received).

Further in this embodiment, the account corresponding to the device 100 maintained in the data store 234 of the dispatch server system 200 can include a plurality of predefined locations, each corresponding to a respective one of the device interfaces 500-502 of the device 100. The destination lookup component 232 of the dispatch server system 200 can use the input information to select a predefined location corresponding to the input information from the plurality of predefined locations.

By way of illustration, the device 100 may include a plurality of pushbuttons. Each pushbutton can be assigned a different predefined location such that when a user presses a first button the destination for the trip can be a first predefined location, whereas when the user presses a second button the destination for the trip can be a second predefined location.

As shown in FIG. 5, the device 100 may further include a light assembly 504. The light assembly 504 can illuminate upon receiving, at the device 100, a signal signifying the vehicle for the trip in the vehicle is within a set proximity to the device 100. According to an example, the light assembly 504 can illuminate when the vehicle is within the set proximity. Pursuant to another example, the light assembly 504 can generate differing outputs based on the proximity of the vehicle to the device 100. For instance, the light assembly 504 can illuminate a first color when the vehicle is within a first distance from the device 100 and a second color when the vehicle is within a second distance from the device 100 (where the first and second colors differ and where the first and second distances differ). It is also contemplated that the light assembly 504 can vary intensity of the light, position of output of the light relative to a housing of the device 100, pulsing of the light, an animation, or a combination thereof in addition to or instead of the color of the light. Thus, the light assembly 504 can generate the differing outputs as the vehicle is within set progressively smaller concentric proximities to the device 100. The purpose of the light assembly 504 is to assist the user in determining the proximity of the vehicle to the user by use of the device 100 itself.

Figure 6:
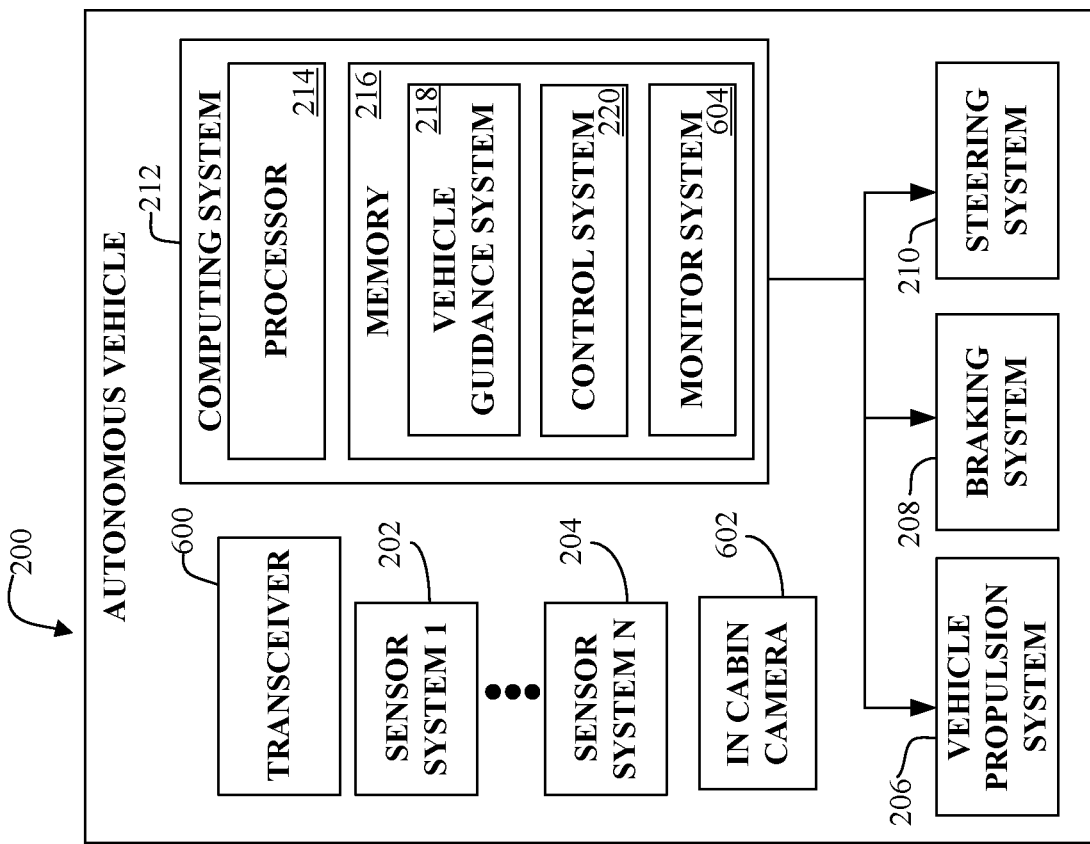
FIG. 6 illustrates another exemplary autonomous vehicle.

Turning now to FIG. 6, the autonomous vehicle 200 is illustrated in accordance with various embodiments. As depicted, the autonomous vehicle 200 may further include a transceiver 600. The transceiver 600 is configured to transmit data from the autonomous vehicle 200 and/or receive data at the autonomous vehicle 200. Thus, the autonomous vehicle 200 can exchange data with the dispatch server system 222.

As shown in FIG. 6, the autonomous vehicle 200 may further include an in-cabin camera 602 and the memory 216 may include a monitor system 604. The in-cabin camera 602 can monitor an interior of the autonomous vehicle 200. The in-cabin camera 602 can view the entire interior of the autonomous vehicle 200 and/or can focus on a specific passenger of the autonomous vehicle 200. The monitor system 604 can control the in-cabin camera 602. The monitor system 604 can receive input from a user and activate use of the in-cabin camera 602 in response to the input. For example, the input can comprise a request from a parent indicating that the in-cabin camera 602 monitor their child as the child travels in the autonomous vehicle 200. The monitor system 604 can further transmit information generated by the in-cabin camera 602 to a specific location, such as a mobile computing device of the parent in the example above.

Figure 7:
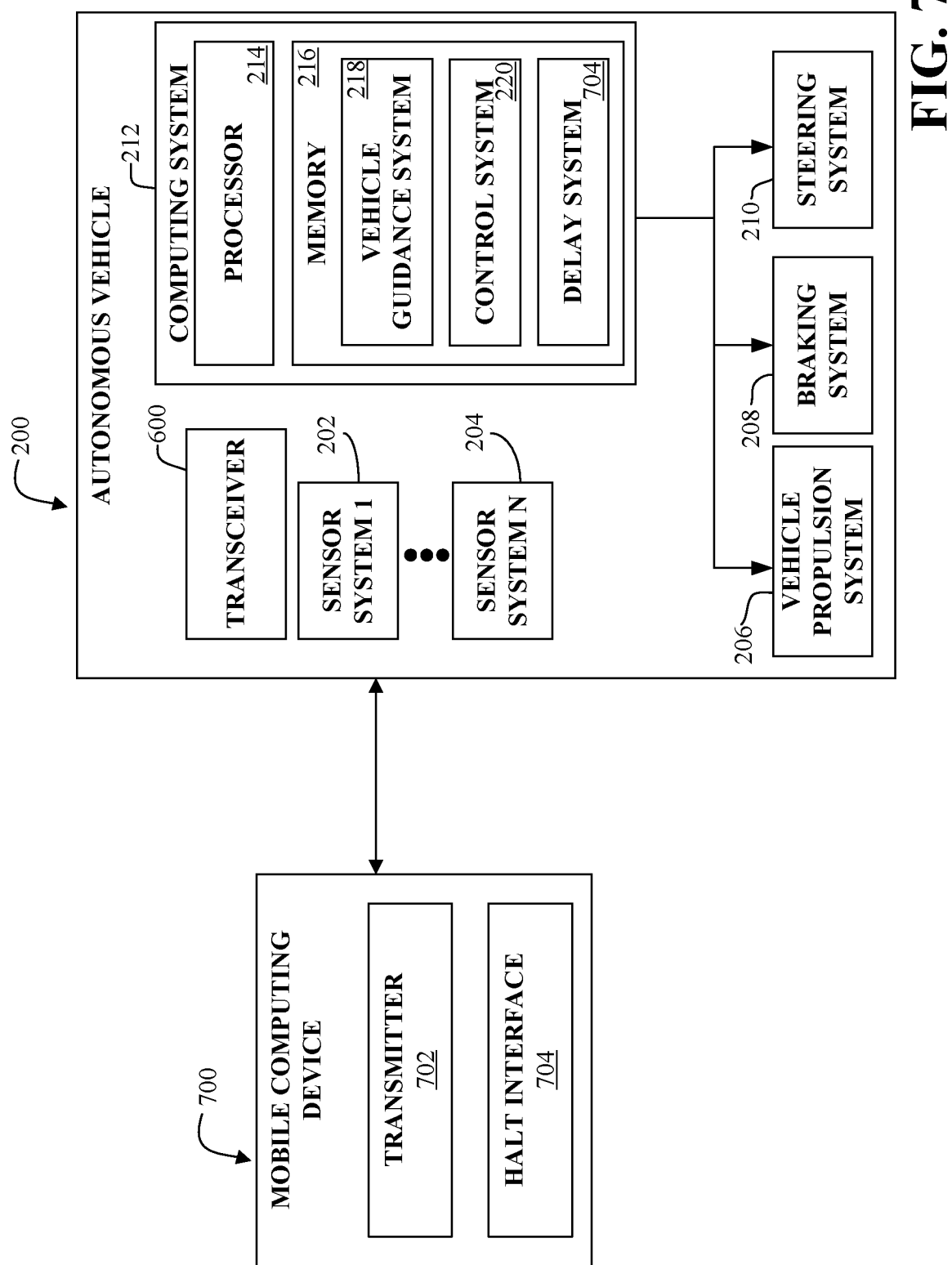
FIG. 7 illustrates an exemplary mobile computing device and an exemplary autonomous vehicle.

Turning now to FIG. 7, illustrated is an exemplary mobile computing device 700 and the autonomous vehicle 200. The mobile computing device 700 includes a transmitter 702 and a halt interface 704. The halt interface 704 can receive an input from a user of the mobile computing device 700 signifying a desire from the user to halt or delay movement of a vehicle. In the illustrated embodiment, the autonomous vehicle 200 includes the transceiver 600 configured to transmit data from the autonomous vehicle 200 and/or receive data at the autonomous vehicle 200. Thus, the autonomous vehicle 200 can exchange data with the mobile computing device 700 (e.g., the data can be routed via server system(s), various network nodes, etc.). The memory 216 of the autonomous vehicle 200 further includes a delay system 704. Responsive to receipt of data from the mobile computing device 700 signifying input at the halt interface 704, the delay system 704 can halt movement of the autonomous vehicle 200 for a set period of time. The period of time may be based on a preference of the user of the mobile computing device 700, reason for the delay, destination, chronological information, or the like.

For example, as the autonomous vehicle 200 travels along a route with the user riding in the autonomous vehicle 200, the user can decide to stop mid-route to get a drink at a coffee shop. The user may desire that the autonomous vehicle 200 waits while they get the drink. The user can request via the halt interface 704 that the autonomous vehicle 200 halt movement from when the user exits the autonomous vehicle 200 to when the user reenters the autonomous vehicle 200 after purchasing the drink (e.g., the autonomous vehicle 200 can be controlled by the delay system 704 to remain in the same geographic location). Again following the above example, it is also contemplated that the halt interface 704 can cause the autonomous vehicle 200 to remain within close geographic proximity of the coffee shop in situations where the autonomous vehicle 200 is unable to remain parked while the user is out of the autonomous vehicle 200 prior to reentry.

By way of another illustration, via the halt interface 704 a user can delay arrival of an autonomous vehicle 200 at a pick-up location for a trip in the autonomous vehicle 200 requested by the user. For example, as the autonomous vehicle 200 approaches the pick-up location, if the user is not ready to be picked up by the autonomous vehicle 200, then the user can request the autonomous vehicle 200 wait a period of time (e.g., an additional 5 minutes) before arriving at the pick-up location. Where a user delays arrival of the autonomous vehicle 200 at the pick-up location for extended periods of time (e.g., more than 15 minutes), rather than the autonomous vehicle 200 delaying arrival or waiting at the pick-up location for the extended period of time, a differing autonomous vehicle can be dispatched for the user.

Figure 8:
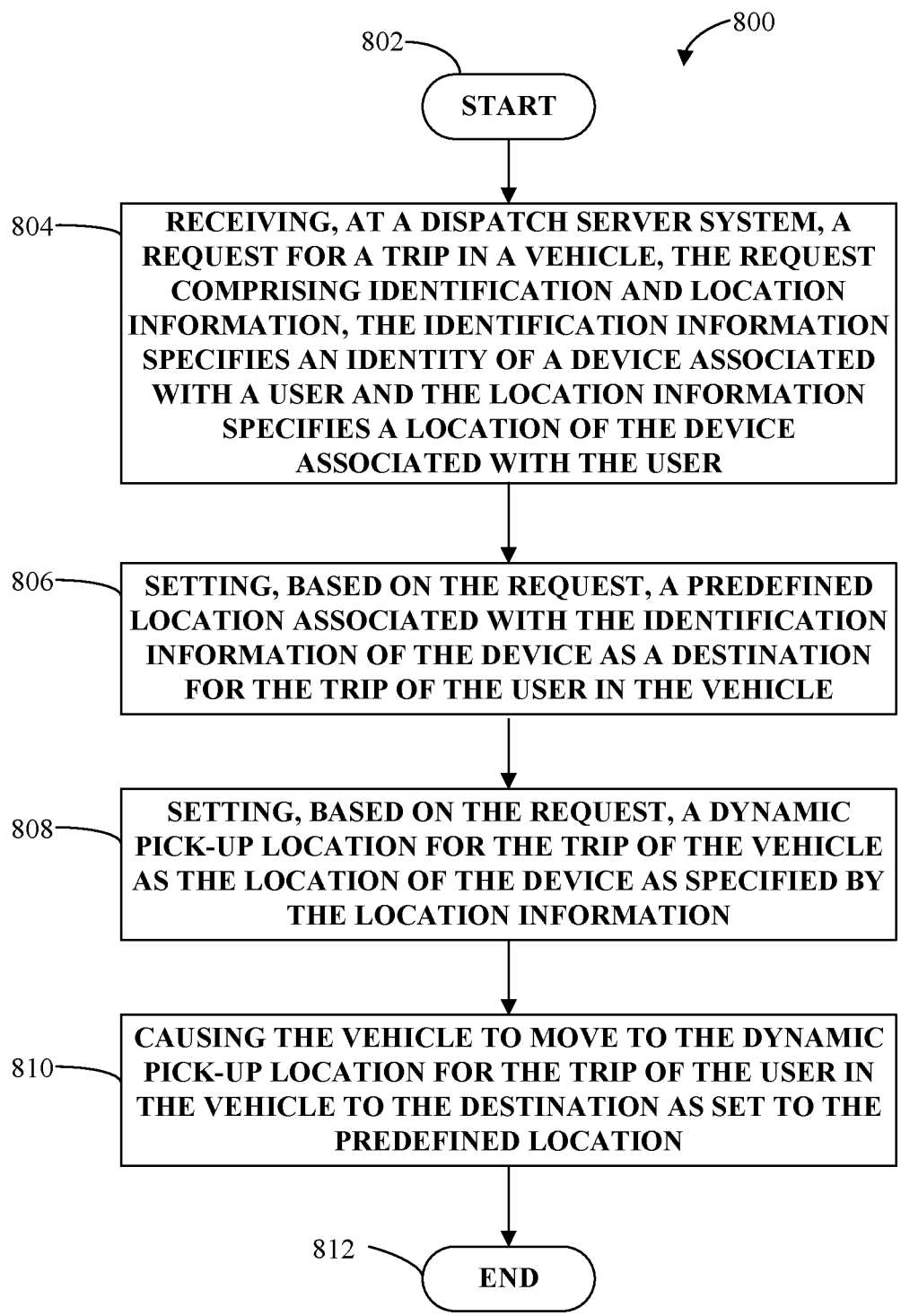
FIG. 8 is a flow diagram that illustrates an exemplary methodology executed by a dispatch server system that facilitates movement of an autonomous vehicle.
Figure 9:
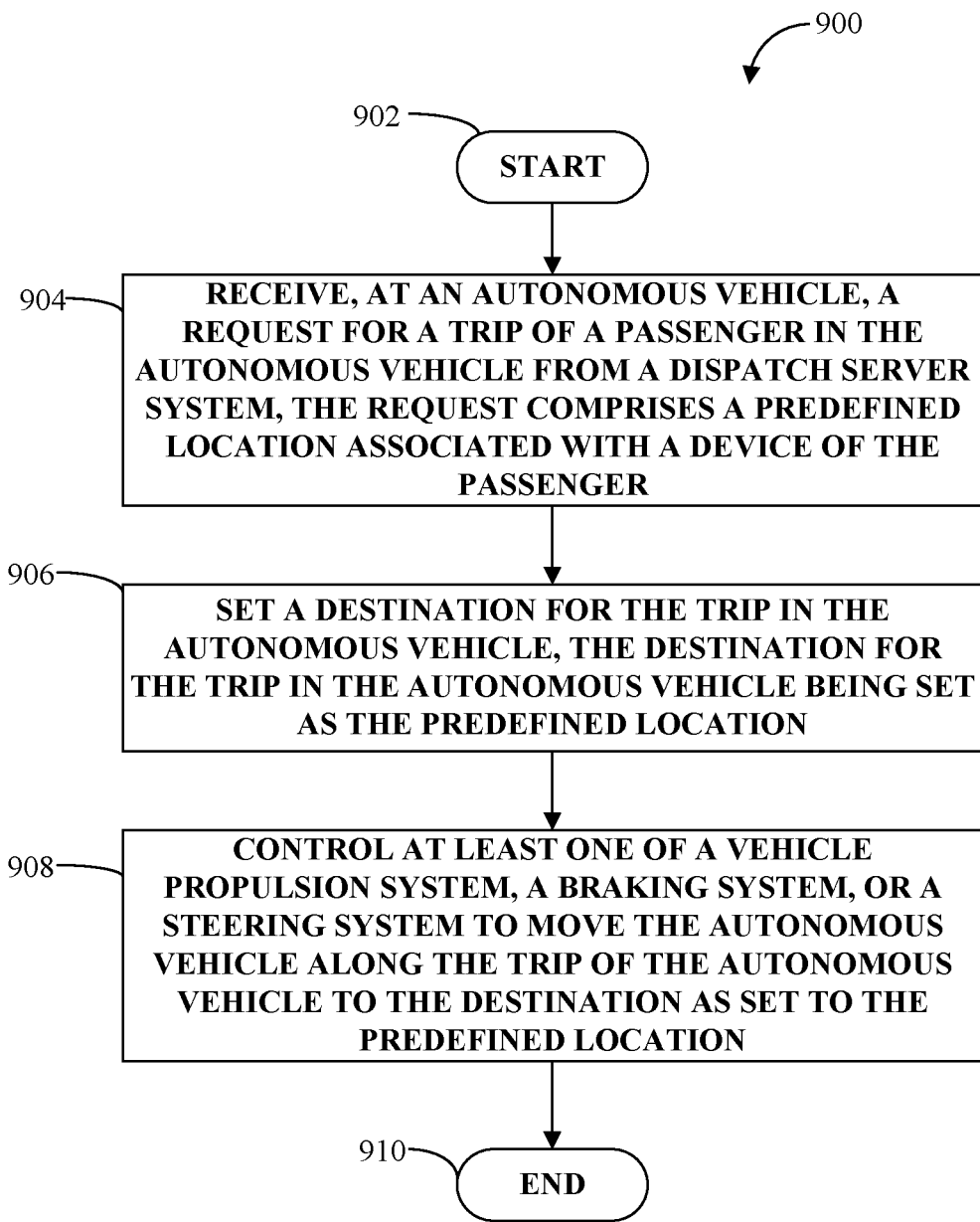
FIG. 9 is a flow diagram that illustrates an exemplary methodology executed by an autonomous vehicle computing system that facilitates movement of the autonomous vehicle.

FIGS. 8-9 illustrate exemplary methodologies relating to controlling a vehicle based on output from a dispatch server system. While the methodologies are shown as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

Referring now to FIG. 8, an exemplary methodology 800 for controlling a dynamic pick-up location for a trip of user in a vehicle is illustrated. The methodology 800 starts at 802, and at 804, a dispatch server system receives a request for a trip in the vehicle. The request comprises identification information and location information. The identification information specifies an identity of a device associated with the user and the location information specifies a location of the device associated with the user. The dispatch server system may be configured to be a dedicated endpoint of information routed from the device. At 806, based on the request, the dispatch server system sets a predefined location associated with the identification information of the device as a destination for the trip of the user in the vehicle. The predefined location is defined in an account corresponding to the identification information of the device maintained by the dispatch server system. At 808, based on the request, the dispatch server system sets the dynamic pick-up location for the trip of the vehicle as the location of the device as specified by the location information. At 810, the methodology 800 includes causing the vehicle to move to the dynamic pick-up location for the trip of the user in the vehicle to the destination as set to the predefined location. The methodology 800 concludes at 812.

In an embodiment, the request further includes user intention data. The user intention data signifies whether the request received by the device was intentionally provided to hail the vehicle. In a version of this embodiment, the methodology 800 further includes determining, based on the user intention data, whether the request was intentionally provided by the user. The step of causing the vehicle to move to the pick-up location can be a function of whether the request was intentionally provided.

In another embodiment, the pick-up location is dynamically adjusted based on a modification to the location of the device after receipt of the request.

In yet another embodiment, the request further includes input information. The device can include a plurality of device interfaces and the input information can correspond to a device interface from the plurality of device interfaces via which an input is received from the user. In a version of this embodiment, the account corresponding to the identification information of the device includes a plurality of predefined locations. The step of setting the predefined location as the destination for the trip of the user in the vehicle further comprises selecting a predefined location corresponding to the input information from the plurality of predefined locations.

In a further embodiment, the vehicle is an autonomous vehicle in a fleet of autonomous vehicles.

Referring now to FIG. 9, an exemplary methodology 900 for controlling an autonomous vehicle is illustrated. The methodology 900 starts at 902, and at 904, the autonomous vehicle receives a request for a trip of a passenger in the autonomous vehicle from a dispatch server system. The request comprises a predefined location associated with a device of the passenger. The dispatch server system is configured to be a dedicated endpoint of information routed from the device. The dispatch server system receives identification information specifying an identity of the device. The predefined location is defined in an account corresponding to the identification information of the device maintained by the dispatch server system prior to receipt of the identification information. At 906, the autonomous vehicle can set a destination for the trip in the autonomous vehicle. The destination for the trip in the autonomous vehicle can be set as the predefined location. At 908, the autonomous vehicle is operated by controlling at least one of a vehicle propulsion system, a braking system, or a steering system to move the autonomous vehicle along the route as selected for the trip to the destination. The methodology 900 concludes at 910.

In an embodiment, the autonomous vehicle is further configured to set a dynamic pick-up location for the trip in the autonomous vehicle. The request further comprises location information specifying a location of the device associated with the passenger. The dynamic pick-up location for the trip of the passenger of the autonomous vehicle is set as the location of the device as specified by the location information. The autonomous vehicle is operated by controlling at least one of the vehicle propulsion system, the braking system, or the steering system to move the autonomous vehicle to the pick-up location. In a version of this embodiment, the dynamic pick-up location for the trip in the autonomous vehicle is dynamically adjusted based on a modification to the location of the device after receipt of the request.

In another embodiment, the autonomous vehicle is further configured to select a route for the trip of the passenger of the autonomous vehicle. The route can be selected from a plurality of potential routes to the destination. For example, the route for the passenger can be selected based on a predefined preference of the passenger. Following this example, the account corresponding to the identification information of the device can include the predefined preference of the passenger.

Figure 10:
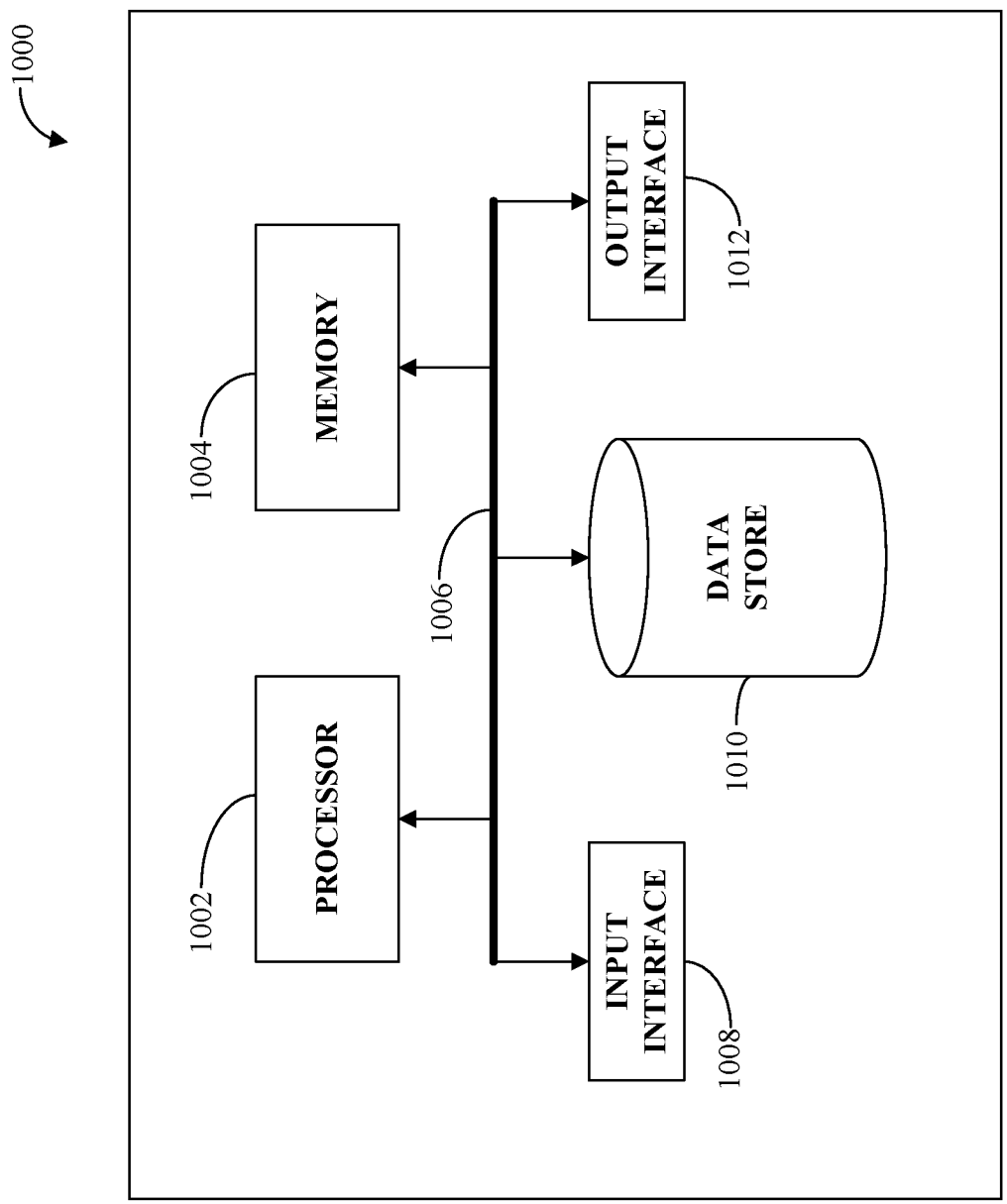
FIG. 10 illustrates an exemplary computing system.

Referring now to FIG. 10, a high-level illustration of an exemplary computing device that can be used in accordance with the systems and methodologies disclosed herein is illustrated. For instance, the computing device 1000 may be or include the computing system 212. According to another example, the computing device 1000 may be or include the mobile computing device 700. Pursuant to yet another example, the dispatch server system 222 can be or include the computing device 1000. The computing device 1000 includes at least one processor 1002 that executes instructions that are stored in a memory 1004. The instructions may be, for instance, instructions for implementing functionality described as being carried out by one or more components discussed above or instructions for implementing one or more methods described above. The processor 1002 may be a GPU, a plurality of GPUs, a CPU, a plurality of CPUs, a multi-core processor, etc. The processor 1002 may access the memory 1004 by way of a system bus 1006. In addition to storing executable instructions, the memory 1004 may also store roadways, user identification, user preferences, etc.

The computing device 1000 additionally includes a data store 1010 that is accessible by the processor 1002 by way of the system bus 1006. The data store 1010 may include executable instructions, roadways, user identification, user preferences, etc. The computing device 1000 also includes an input interface 1008 that allows external devices to communicate with the computing device 1000. For instance, the input interface 1008 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
  a vehicle propulsion system;
  a braking system;
  a steering system;
  a computing system that is in communication with the vehicle propulsion system, the brake system, and the steering system, wherein the computing system comprises:
    a processor; and
    memory that stores computer-executable instructions that, when executed by the processor, cause the processor to perform acts comprising:
      receiving, at the autonomous vehicle from a dispatch server system, a request for a trip in the autonomous vehicle for a passenger, the request being responsive to a single touch input into a device dedicated for summoning the autonomous vehicle to a location of the device for the trip in the autonomous vehicle and the single touch input being determined by the dispatch server system as being intentionally provided based on an orientation of the device, wherein the determination is based on the orientation of the device when the single touch input is received, wherein the single touch input is determined to be unintentionally provide when the orientation of the device comprises a device interface of the device facing downward, wherein the request specifies a predefined destination location associated with the device, wherein the dispatch server system is configured to be a dedicated endpoint of information routed from the device, and wherein the predefined destination location is defined in an account corresponding to the device retained by the dispatch server system prior to the receipt of the information;
      generating a route for the trip in the autonomous vehicle for the passenger to the predefined destination location; and
      controlling at least one of the vehicle propulsion system, the braking system, or the steering system to traverse along the route for the trip in the autonomous vehicle for the passenger to the predefined destination location.

2. The autonomous vehicle of claim 1, wherein:
  the request further specifies a location of the device of the passenger; and
  the acts further comprise:
    controlling at least one of the vehicle propulsion system, the braking system, or the steering system to pick up the passenger at the location of the device for the trip in the autonomous vehicle.

3. The autonomous vehicle of claim 2, the acts further comprising:
  receiving updated location information specifying an updated location of the device of the passenger subsequent to receipt of the request; and
  controlling at least one of the vehicle propulsion system, the braking system, or the steering system to change to pick up the passenger at the updated location of the device for the trip in the autonomous vehicle.

4. The autonomous vehicle of claim 1, wherein the route for the trip in the autonomous vehicle for the passenger to the predefined destination location is generated based on a predefined preference of the passenger, wherein the account corresponding to the device further comprises the predefined preference of the passenger.

5. The autonomous vehicle of claim 1, wherein the predefined location is defined in the account corresponding to the device during setup of the device.

6. The autonomous vehicle of claim 1, the acts further comprising:
  controlling the autonomous vehicle to operate according to a predefined restriction for the trip in the autonomous vehicle for the passenger, wherein the predefined restriction is defined in the account corresponding to the device retained by the dispatch server system prior to the receipt of the information.

7. The autonomous vehicle of claim 6, wherein the predefined restriction comprises a whitelist of passengers permitted to ride in the autonomous vehicle with the passenger for the trip.

8. The autonomous vehicle of claim 1, further comprising:
an in-cabin camera;
wherein the acts further comprise:
receiving input from a remote computing device that causes activation of the in-cabin camera to monitor the passenger during the trip in the autonomous vehicle; and
transmitting information captured by the in-cabin camera to the remote computing device responsive to receipt of the input.

9. A method of controlling an autonomous vehicle, comprising:
receiving, at the autonomous vehicle from a dispatch server system, a request for a trip in the autonomous vehicle for a passenger, the request being responsive to a single touch input via an input interface into a device dedicated for summoning the autonomous vehicle to a location of the device for the trip in the autonomous vehicle and the single touch input being determined by the dispatch server system as being intentionally provided based on light data indicative of light detected by the device when the single touch input is received by the device, wherein transmission of the request is prevented when the single touch input is determined to be unintentionally provided, wherein the determination is based on the light detected by the device when the single touch input is received, wherein the single touch input is determined to be unintentionally provided when the light data signifies that the light detected by the device is below an amount of light, wherein the request specifies a predefined destination location defined for the device, wherein the dispatch server system is configured to be a dedicated endpoint of information routed from the device, and wherein the predefined destination location is defined in an account corresponding to the device retained by the dispatch server system prior to the receipt of the information;
generating a route for the trip in the autonomous vehicle for the passenger to the predefined destination location; and
controlling the autonomous vehicle to traverse along the route for the trip in the autonomous vehicle for the passenger to the predefined destination location.

10. The method of claim 9, further comprising:
controlling the autonomous vehicle to travel to a location of the device of the passenger to pick up the passenger, wherein the request further specifies the location of the device of the passenger.

11. The method of claim 10, further comprising:
receiving updated location information specifying an updated location of the device of the passenger subsequent to receipt of the request; and
changing the autonomous vehicle to travel to the updated location of the device of the passenger to pick up the passenger.

12. The method of claim 9, wherein the route for the trip in the autonomous vehicle for the passenger to the predefined destination location is generated based on a predefined preference of the passenger, wherein the account corresponding to the device further comprises the predefined preference of the passenger.

13. The method of claim 9, wherein the predefined location is defined in the account corresponding to the device during setup of the device.

14. The method of claim 9, further comprising:
controlling the autonomous vehicle to operate according to a predefined restriction for the trip in the autonomous vehicle for the passenger, wherein the predefined restriction is defined in the account corresponding to the device retained by the dispatch server system prior to the receipt of the information.

15. The method of claim 9, further comprising:
receiving an activation request from a remote computing device that causes activation of an in-cabin camera to monitor the passenger during the trip in the autonomous vehicle, wherein the autonomous vehicle comprises the in-cabin camera; and
transmitting information captured by the in-cabin camera to the remote computing device responsive to receipt of the activation request.

16. The autonomous vehicle of claim 1, wherein the information routed from the device includes identification information specifying an identity of the device, wherein responsive to the single touch input into the device, the dispatch server system is configured to retrieve the predefined location in the account corresponding to the identification information from a data store of the dispatch server system.

17. The autonomous vehicle of claim 3, wherein the updated location information specifying the updated location of the device of the passenger is received responsive to detected movement of the device.

18. The autonomous vehicle of claim 3, wherein the updated location information specifying the updated location of the device of the passenger is periodically received subsequent to the receipt of the request.

19. An autonomous vehicle, comprising:
a vehicle propulsion system;
a braking system;
a steering system;
a computing system that is in communication with the vehicle propulsion system, the brake system, and the steering system, wherein the computing system comprises:
a processor; and
memory that stores computer-executable instructions that, when executed by the processor, cause the processor to perform acts comprising:
receiving, at the autonomous vehicle from a dispatch server system, a request for a trip in the autonomous vehicle for a passenger, the request being responsive to a single touch input via an input interface into a device dedicated for summoning the autonomous vehicle to a location of the device for the trip in the autonomous vehicle and the single touch input being determined by the device as being intentionally provided based on light data indicative of light detected by the device when the single touch input is received by the device, wherein transmission of the request is prevented when the single touch input is determined to be unintentionally provided, wherein the single touch input is determined to be unintentionally provided when the light data signifies that the light detected by the device is below an amount of light, wherein the request specifies a predefined destination location defined for the device, and wherein the predefined destination location is defined in an account corresponding to the device retained by the dispatch server system prior to the receipt of the information;

controlling at least one of the vehicle propulsion system, the braking system, or the steering system to travel to a location of the device to pick up the passenger;

generating a route for the trip in the autonomous vehicle for the passenger to the predefined destination location; and controlling at least one of the vehicle propulsion system, the braking system, or the steering system to traverse along the route for the trip in the autonomous vehicle for the passenger to the predefined destination location.

20. The autonomous vehicle of claim 19, the acts further comprising:

receiving updated location information specifying an updated location of the device of the passenger subsequent to receipt of the request; and controlling at least one of the vehicle propulsion system, the braking system, or the steering system to change to pick up the passenger at the updated location of the device for the trip in the autonomous vehicle.

* * * * *